United States Patent
Miyano et al.

(10) Patent No.: US 9,438,990 B2
(45) Date of Patent: Sep. 6, 2016

(54) ELECTRONIC DEVICE

(71) Applicant: KYOCERA CORPORATION, Kyoto (JP)

(72) Inventors: Tomoaki Miyano, Kameyama-shi (JP); Tomohiro Inagaki, Yokohama (JP); Shun Kazama, Yokohama (JP); Akio Kihara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/404,584

(22) PCT Filed: May 24, 2013

(86) PCT No.: PCT/JP2013/003308
§ 371 (c)(1),
(2) Date: Nov. 28, 2014

(87) PCT Pub. No.: WO2013/179627
PCT Pub. Date: Dec. 5, 2013

(65) Prior Publication Data
US 2015/0117678 A1    Apr. 30, 2015

(30) Foreign Application Priority Data

May 29, 2012    (JP) ................. 2012-122506

(51) Int. Cl.
*H04R 25/00*    (2006.01)
*H04R 1/46*    (2006.01)
*H04M 1/03*    (2006.01)
*H04M 1/60*    (2006.01)
(Continued)

(52) U.S. Cl.
CPC ............... *H04R 1/46* (2013.01); *B06B 1/0603* (2013.01); *B06B 1/0611* (2013.01); *B06B 3/00* (2013.01); *G10K 9/122* (2013.01); *H04M 1/0245* (2013.01); *H04M 1/03* (2013.01); *H04M 1/6008* (2013.01); *H04M 19/047* (2013.01); *H04R 7/045* (2013.01); *H04M 1/0214* (2013.01); *H04R 3/02* (2013.01); *H04R 17/00* (2013.01); *H04R 2499/11* (2013.01); *H04R 2499/15* (2013.01)

(58) Field of Classification Search
CPC .. H04M 1/03; H04M 1/0245; H04M 1/6008; H04M 19/047; H04R 3/02; H04R 7/045; H04R 2499/11
See application file for complete search history.

(56) References Cited

U.S. PATENT DOCUMENTS

2012/0162143 A1    6/2012    Kai et al.

FOREIGN PATENT DOCUMENTS

JP    05-022382 A    1/1993
JP    05-176045 A    7/1993
(Continued)

OTHER PUBLICATIONS

Written Opinion of the International Searching Authority; PCT/JP2013/003308; Jul. 30, 2013; with concise explanation.
(Continued)

*Primary Examiner* — Tuan D Nguyen
(74) *Attorney, Agent, or Firm* — Studebaker & Brackett PC

(57) ABSTRACT

Provided is an electronic device that generates, by vibrating a vibration body, vibration sound by the vibration. The electronic device executes a side tone function by using sound collected by a microphone 7 during the vibration of the vibration body. When an open/close detector 100 detects a closed state, the electronic device also stops the side tone, improving usability of the electronic device.

23 Claims, 10 Drawing Sheets

(51) Int. Cl.
*H04R 7/04* (2006.01)
*B06B 1/06* (2006.01)
*B06B 3/00* (2006.01)
*G10K 9/122* (2006.01)
*H04M 19/04* (2006.01)
*H04R 17/00* (2006.01)
*H04M 1/02* (2006.01)
*H04R 3/02* (2006.01)

(56) References Cited

FOREIGN PATENT DOCUMENTS

| | | |
|---|---|---|
| JP | 2004-187031 A | 7/2004 |
| JP | 2005-348193 A | 12/2005 |
| JP | 2006-333021 A | 12/2006 |
| JP | 2007-082009 A | 3/2007 |
| JP | 2007-208948 A | 8/2007 |
| JP | 2007/267014 A | 10/2007 |
| JP | 2007-267014 A | 10/2007 |
| JP | 2011-053744 A | 3/2011 |
| JP | 2011175518 A | 9/2011 |

OTHER PUBLICATIONS

International Search Report; PCT/JP2013/003308; Jul. 30, 2013; with concise explanation.

An Office Action; "Notice of Reasons for Rejection," issued by the Japanese Patent Office on Jun. 21, 2016, which corresponds to Japanese Patent Application No. 2012-122506 and is related to U.S. Appl. No. 14/404,584; with English language statement of relevance.

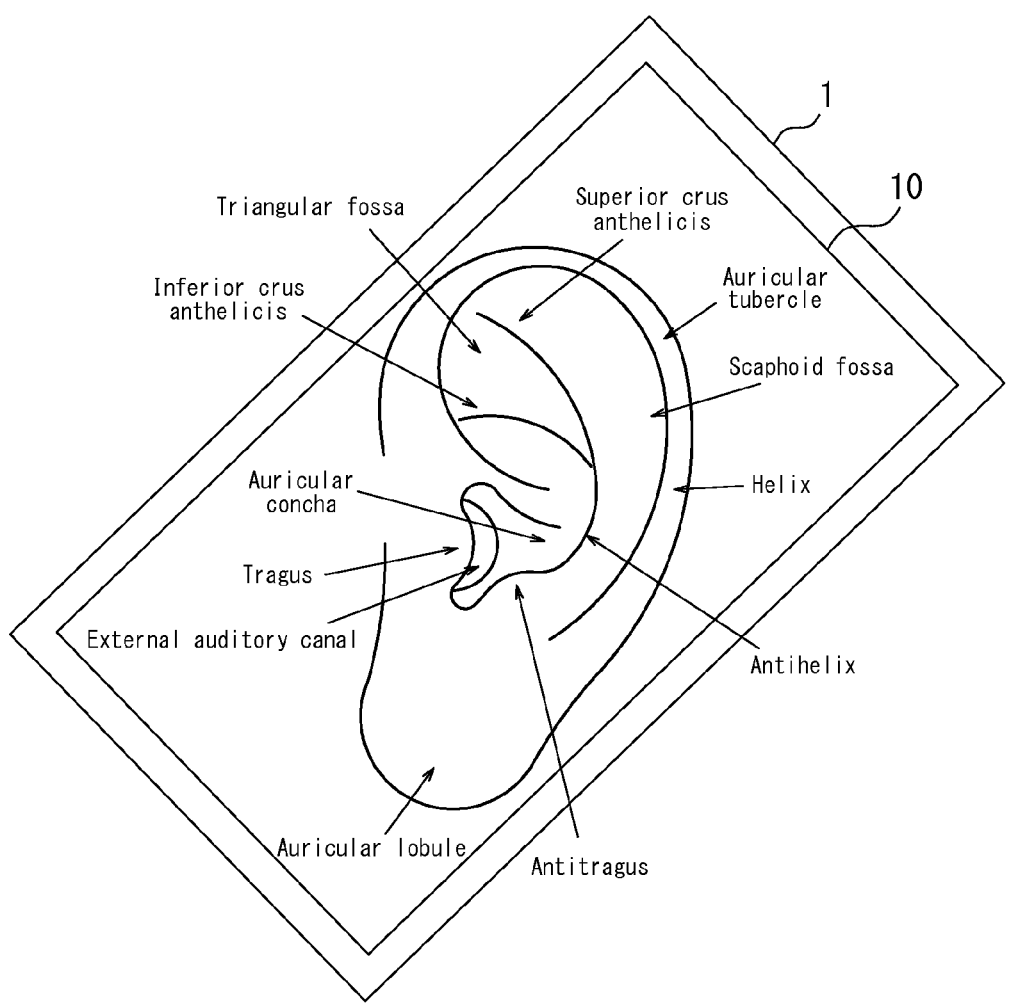

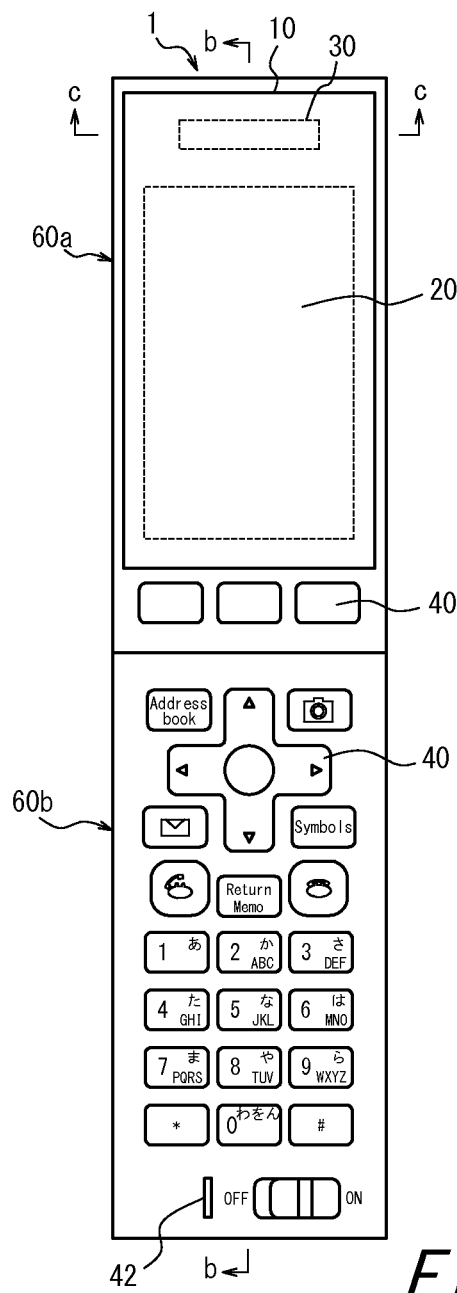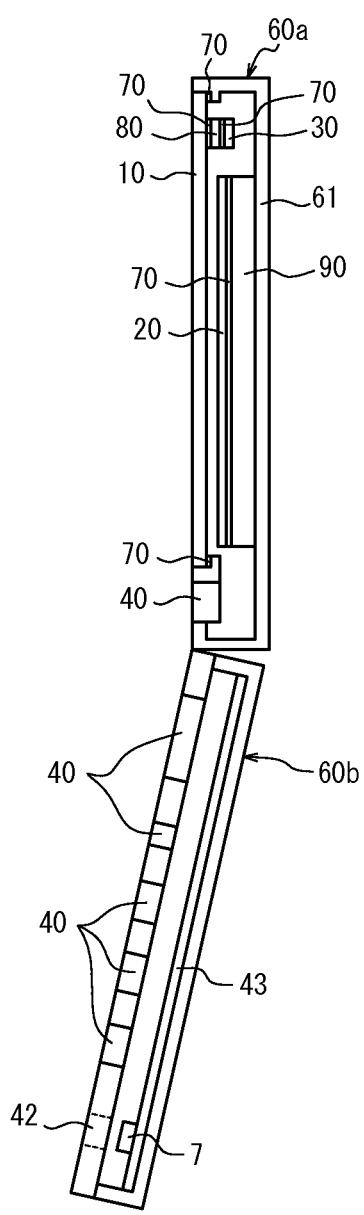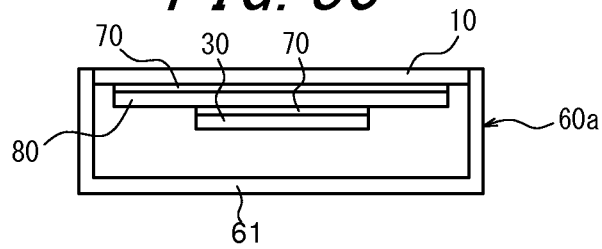

ELECTRONIC DEVICE

CROSS-REFERENCE TO RELATED APPLICATION

This application claims priority to and the benefit of Japanese Patent Application No. 2012-122506 filed on May 29, 2012, the entire contents of which are incorporated herein by reference.

TECHNICAL FIELD

The present invention relates to an electronic device that includes a housing and a vibration body held by the housing and that generates sound though cartilaginous conduction by pressing the vibration body to an ear of a user.

BACKGROUND

Patent Literature 1 describes an electronic device such as a mobile phone that transmits air conduction sound and bone conduction sound to a user. Patent Literature 1 also describes that the air conduction sound is sound perceived by an auditory nerve of a user as a result of an eardrum being vibrated by an air vibration that is created by a vibration of an object and that travels through an external auditory canal down to the eardrum. Furthermore, Patent Literature 1 describes that the bone conduction sound is transmitted to the auditory nerve of the user through a part of a user's body (e.g. a cartilaginous portion of an external ear) that is in contact with the vibrating object.

In the mobile phone described in Patent Literature 1, a rectangular plate-shaped vibration body configured by piezoelectric bimorph and a flexible material is attached to an outer surface of a housing via an elastic member. Patent Literature 1 also describes that, upon application of a voltage to the piezoelectric bimorph of the vibration body, the piezoelectric material is expanded and contracted in a longitudinal direction, thereby causing the vibration body to undergo flexure vibration. As a result, when the user places the vibration body in contact with an auricle, the air conduction sound and the bone conduction sound are transmitted to the user.

CITATION LIST

Patent Literature

Patent Literature 1: Japanese Patent Application Publication No. 2005-348193

SUMMARY OF INVENTION

Technical Problem

However, the electronic device described in Patent Literature 1 is a mobile phone or the like that includes the housing and the vibration body attached to the outer surface of the housing, and the electronic device conveys sound by vibrating the vibration body. Accordingly, Patent Literature 1 does not take into consideration a problem faced by an electronic device of a type that transmits air conduction sound and vibration sound by vibrating a panel such as a protection panel of a display surface.

The present invention is to provide an electronic device of a type that transmits vibration sound by vibrating a panel while usability of the electronic device is achieved.

Solution to Problem

One aspect of the present invention resides in an electronic device including: a pair of housings configured to be in an opened state and a closed state; an open/close detector configured to detect the opened/closed state of the pair of housings; a vibration body disposed in one of the pair of housings; and a microphone disposed on another one of the pair of housings. The vibration body is vibrated in the opened state, and generates vibration sound that conducts through a portion of a user's body by the vibration being executed. A side tone is executed, during the vibration body being vibrated, by using sound collected by the microphone. When the open/close detector detects the closed state, the side tone is stopped or interrupted.

Advantageous Effects of Invention

Provided is an electronic device of a type that transmits vibration sound by vibrating a panel with preferable usability.

BRIEF DESCRIPTION OF DRAWINGS

The present invention will be further described below with reference to the accompanying drawings, wherein:

FIG. 2 illustrates a preferable shape of a panel;

FIGS. 3A to 3C schematically illustrate a part of a housing structure of an electronic device according to one embodiment of the present invention;

DESCRIPTION OF EMBODIMENTS

Embodiments of the present invention will be described with reference to the accompanying drawings.

First Embodiment

Figure 1:
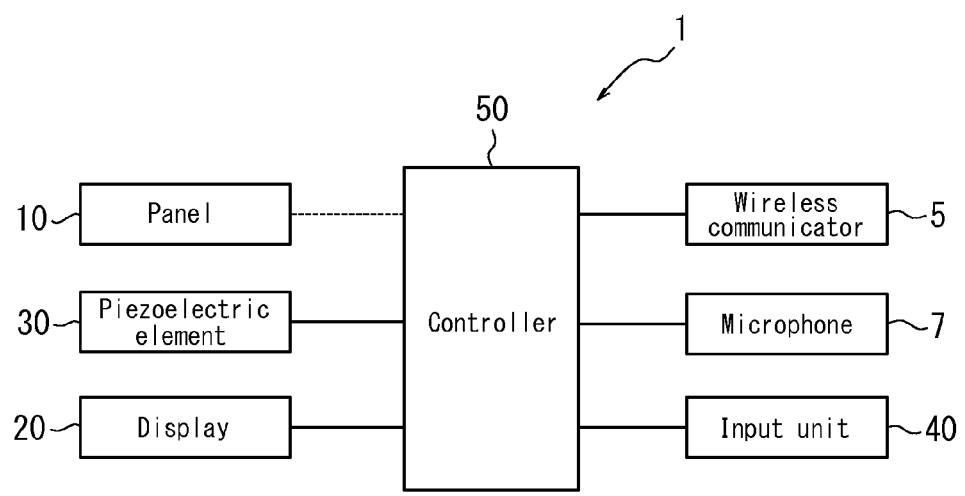
FIG. 1 is a function block diagram of a part of an electronic device according to the first embodiment of the present invention.

FIG. 1 is a function block diagram of a part of an electronic device 1 according to the first embodiment of the present invention. The electronic device 1 is an openable/closable mobile phone that may be switched between a closed state where two housings having a voice communication function are overlapped on each other in a large area and an opened state where the two housings are overlapped in a small or no area. For example, the electronic device 1 may be of a folding type or a slide type.

The electronic device 1 includes a wireless communicator 5, a microphone 7, a panel 10, a display 20, a piezoelectric element 30, an input unit 40, a controller 50, and an open/close detector 100. The wireless communicator 5 has a general configuration and is wirelessly connected to a communication network via a base station or the like. The microphone 7 is configured by a known microphone such as a capacitor microphone and is configured to collect sound such as transmission sound that a user utters while voice communication is in progress via the wireless communicator 5. When the electronic device 1 according to the present embodiment functions as a mobile phone, sound which is transmitted to an inner part of the human body is generated by vibration of the panel 10 generated by the piezoelectric element 30. The sound to be transmitted to an inner part of the human body passes through a soft tissue of the human body (e.g. a cartilage) to vibrate a middle ear or an inner ear.

The panel 10 may be a touch panel that is configured to detect a contact or a cover panel that protects the display 20. The panel 10 may be made of glass or a synthetic resin such as acryl. The panel 10 preferably has a plate shape. The panel 10 may be a flat plate or a curved panel having a gradually inclined surface. When the panel 10 is the touch panel, the panel 10 detects a contact made by a finger of the user, a pen, a stylus pen, or the like. The touch panel may detect a contact using any type, such as a capacitive type, a resistive film type, a surface acoustic wave type (or an ultrasonic type), an infrared type, an electromagnetic induction type, and a load detection type.

The display 20 is a display device such as a liquid crystal display, an organic EL display, and an inorganic EL display. The display 20 is disposed at a back of the panel 10. For example, the display 20 may be disposed on a back surface of the panel 10 using a joining member (e.g. an adhesive agent). As another example, the display 20 may be supported by a housing of the electronic device 1 such that the display 20 is spaced apart from the panel 10.

The piezoelectric element 30 is an element that is configured to undergo expansion and contraction or bending (flexure) in accordance with an electromechanical coupling factor of a constituent material in response to an electric signal (voltage) applied thereto. As a material of the element, ceramic and crystal are used, for example. The piezoelectric element 30 may be a unimorph, a bimorph, or a laminated-type piezoelectric element. The laminated piezoelectric element includes a laminated unimorph element in which layers (e.g. 16 or 24 layers) of unimorph are laminated or a laminated bimorph element in which layers (e.g. 16 or 24 layers) of bimorph are laminated. The laminated-type piezoelectric element is configured, for example, by a laminated structure of a plurality of dielectric layers made of PZT (lead zirconate titanate) and electrode layers each disposed between adjacent ones of the dielectric layers. Unimorph undergoes expansion and contraction in response to an electric signal (voltage) applied thereto, and bimorph undergoes flexure in response to an electric signal (voltage) applied thereto.

The piezoelectric element 30 is disposed on the back surface of the panel 10 (i.e. a surface of an inner side of the electronic device 1). The piezoelectric element 30 is attached to the panel 10 by a joining member (e.g. a double-sided adhesive tape). The piezoelectric element and the panel may be collectively referred to below as a vibration body. The piezoelectric element 30 may also be attached to the panel 10 via an intermediate member (e.g. a metal plate). The piezoelectric element 30 is disposed on the back surface of the panel 10 such that the piezoelectric element 30 is at a predetermined distance from the surface of the inner side of a housing. Preferably, the piezoelectric element 30 remains at a predetermined distance from the surface of the inner side of the housing even in a state where the piezoelectric element 30 undergoes expansion and contraction or flexture. That is to say, the distance between the piezoelectric element 30 and the surface of the inner side of the housing is preferably greater than a maximum amount of deformation of the piezoelectric element 30.

The input unit 40 is configured to receive an operation input from the user and is configured by an operation button (an operation key), for example. When the panel 10 is the touch panel, the panel 10 is also capable of receiving an operation input from the user by detecting a contact made by the user.

The controller 50 is a processor configured to control the electronic device 1. While voice communication is in progress, the controller 50 processes a sound signal that is collected and electro-acoustically transduced by the microphone 7, and the controller 50 also transmits the processed sound signal from the wireless communicator 5. The controller 50 applies, to the piezoelectric element 30, a predetermined electric signal (voltage corresponding to a sound signal representing voice of a party on the phone, a side tone, music including a phone melody or a tune, or the like). The sound signal may be based on music data stored in an internal memory or may be reproduced according to music data stored in an external server and the like via the network.

The open/close detector 100 is configured by using a Hall element disposed on one of the housings and a magnetic force generating member disposed on the other one of the housings. When electronic device 1 reaches or approaches the closed state, the Hall element detects magnetic force and outputs a FOLDER DET signal=0 which is later described.

When applied with an electric signal, the piezoelectric element 30 undergoes expansion and contraction or flexure in a longitudinal direction thereof. In this regard, the panel 10 attached with the piezoelectric element 30 is deformed in conjunction with expansion and contraction or flexture of the piezoelectric element 30, thus resulting in a flexure vibration of the panel 10. The panel 10 undergoes flexure in response to expansion and contraction or flexture of the piezoelectric element 30. The panel 10 is bent directly by the piezoelectric element 30. The state in which the "panel 10 is bent directly by the piezoelectric element" differs from a phenomenon in which the panel is deformed when a certain area of the panel is vibrated due to inertial force of a piezoelectric actuator including the piezoelectric element provided in a casing as adopted in an existing panel speaker. The state in which the "panel 10 is bent directly by the piezoelectric element" includes a state in which the panel is bent directly by expansion and contraction or bending (flexure) of the piezoelectric element via the joining member or via the joining member and a reinforcing member which is later described. Here, a maximum voltage of the electric signal that the controller 50 applies to the piezoelectric element 30 may be ±15 V which is greater than ±5 V, that is, an application voltage of a so-called panel speaker for a purpose of sound conduction using not vibration sound but air conduction sound. With the above configuration, even when the user forcefully presses the panel 10 against a user's body with force greater than or equal to 3 N (force ranging from 5 N to 10 N), the flexure vibration of the panel 10 occurs. As a result, vibration sound which is transmitted through a part of the user's body (e.g. a cartilaginous portion of an external ear) is generated. Note that an amount of the application voltage is appropriately adjustable according to how tightly the panel 10 is fixed to the housing or a support member or according to a capability of the piezoelectric element 30.

The flexure vibration is caused in an area of the panel 10 where the piezoelectric element 30 is disposed and in areas of the panel 10 that are away from the disposed area. The panel 10 includes, in the areas vibrated, a plurality of portions that is configured to vibrate in a direction intersecting with a main surface of the panel 10, and in each of the plurality of portions, a value indicating an amplitude of the vibration transitions over time from plus to minus or vice versa. The panel 10 is vibrated such that areas with relatively large amplitude of vibration and areas with relatively small amplitude of vibration are seemingly distributed randomly or in a cyclic manner across the panel 10 at a certain moment. In other words, the vibration of a plurality of wavelengths is detected across all areas of the panel 10. In order to prevent the aforementioned vibration of the panel 10 from being attenuated even when the user forcefully presses the panel 10 against the user's body with force ranging from, for example, 5 N to 10 N, the maximum voltage that the controller 50 applies to the piezoelectric element 30 may be ±15 V. The above configuration allows the user to listen to sound while placing the ear in contact with the areas of the panel 10, such as a middle portion of the panel 10, that are away from the area where the piezoelectric element 30 is disposed.

The panel 10 may be as large as the user's ear. As illustrated in FIG. 2, the panel 10 may also be larger than the user's ear. In this case, when the user listens to sound, the whole ear tends to be covered by the panel 10 of the electronic device 1. As a result, sound (noise) is prevented from entering through an external auditory canal. It is suffice for the vibration to occur in an area of the panel 10 that is larger than an area having a length corresponding to a distance from an inferior crus of antihelix (i.e. an inferior crus anthelicis) to an antitragus and a width corresponding to a distance from a tragus to an antihelix. It is preferable for the vibration to occur in an area of the panel 10 that is larger than an area having a length corresponding to a distance from a portion of a helix that is near a superior crus of antihelix (i.e. a superior crus anthelicis) to an auricular lobule and a width corresponding to a distance from the tragus to a portion of the helix that is near the antihelix. The areas having the above lengths and widths may have an oblong shape or an elliptical shape with as a major axis corresponding to the length and a minor axis corresponding to the width. Average ear size of the Japanese may be seen from the Japanese Body Dimension Database (1992-1994) or the like distributed by the Research Institute of Human Engineering for Quality Life (HQL). The panel 10 with a size greater than the average ear size of the Japanese would be generally capable of covering a whole ear of a foreigner as well. With the aforementioned dimension and shape, the panel 10 is capable of covering the user's ear, which offers tolerance to misalignment when the user presses the panel 10 to the ear.

By the vibration of the panel 10, the above electronic device 1 is capable of transmitting, to the user, air conduction sound and vibration sound which is transmitted through a part of the user's body (e.g. the cartilaginous portion of the external ear). Accordingly, when the panel 10 outputs sound at substantially the same volume level as a dynamic receiver, less amount of sound propagates to an external environment of the electronic device 1 due to the vibration of air resulting from the vibration of the panel 10, compared to a case of the dynamic receiver. Accordingly, the electronic device 1 is well-suited for a situation where a recorded message is listened to on the train and the like, for example.

Furthermore, since the above electronic device 1 transmits vibration sound by the vibration of the panel 10, even when the user wears an earphone or a headphone, the user is able to listen to sound though the earphone or the headphone and a portion of the body by placing the electronic device 1 in contact with the earphone and the headphone.

The above electronic device 1 transmits sound to the user by the vibration of the panel 10. Accordingly, in a case where the electronic device 1 is not provided with an additional dynamic receiver, it is not necessary to provide the housing with an opening (i.e. a sound discharge opening) for sound transmission. As a result, the waterproof structure of the electronic device 1 is simplified. When the electronic device 1 is provided with a dynamic receiver, the sound discharge opening may be closed by a member that passes air through and blocks liquid. The member that passes air through and blocks liquid may be Gore-Tex™.

FIGS. 3A to 3C schematically illustrate a part of a housing structure of the electronic device 1 according to the first embodiment. FIG. 3A is a front view, FIG. 3B is a sectional view taken along a line b-b of FIG. 3A, and FIG. 3C is a sectional view taken along a line c-c of FIG. 3A. The electronic device 1 illustrated in FIG. 3A-3C is a folding mobile phone in which a cover panel (e.g. an acryl plate), which serves as the panel 10 and is configured to cover the display 20, is provided on a front surface of an upper-side housing 60a, and the input unit 40 is provided in a lower-side housing 60b.

Between the panel 10 and the piezoelectric element 30, a reinforcing member 80 may be disposed. The reinforcing member 80 may be a resin plate, a metal plate, or a resin plate including glass fiber. That is to say, the electronic device 1 according to the first embodiment has a structure where the piezoelectric element 30 and the reinforcing member 80 are adhered by the joining member 70, and the reinforcing member 80 and the panel 10 are adhered by the joining member 70.

Furthermore, in the first embodiment, the display 20 is not adhered to the panel 10 but supported by the housing 60a. That is to say, the electronic device 1 according to the first embodiment has a structure where the display 20 is spaced apart from the panel 10, and the display 20 is adhered to the support portion 90, i.e., a part of the housing 60a, by the joining member 70. The support unit 90 is not limited to be configured as the part of the housing 60 and may be configured by metal, resin, or the like, as a member independent from the housing 60.

The lower-side housing 60b is provided with a mouthpiece 42. The lower-side housing 60b is also installed, in a circuit substrate 43 embedded in the housing 60b, with the microphone 7, such that the microphone 7 opposes to the mouthpiece 42. Accordingly, the microphone 7 has directivity directed toward a direction to which the input unit 40 faces.

According to the electronic device 1 of the present embodiment, the reinforcing member 80 and the panel 10 are deformed due to deformation of the piezoelectric element 30 attached to the panel 10 via the reinforcing member 80, and air conduction sound and vibration sound are transmitted to an object that is in contact with the deformed panel 10. Accordingly, air conduction sound and vibration sound are transmitted to the user without the need for pressing the piezoelectric element 30 itself to the ear. Furthermore, the piezoelectric element 30 is attached to the surface of the inner side of the housing 60a of the panel 10. Accordingly, air conduction sound and vibration sound are transmitted to the user without having to protrude the piezoelectric element 30 from an outer surface of the housing 60a. Moreover, the deformation is caused in the area of the panel 10, where the piezoelectric element 30 is disposed and in other areas of the panel 10, for transmission of air conduction sound and vibration sound. Accordingly, the user is able to hear air conduction sound transmitted through air and to hear vibration sound by placing the ear in contact with any position of the panel 10.

Furthermore, by disposing the reinforcing member 80 between the piezoelectric element 30 and the panel 10, when the panel 10 is applied with an external force, the applied external force is less likely to be transferred to the piezoelectric element 30 and damage the piezoelectric element 30. Even when the panel 10 is forcefully pressed against the human body, the attenuation in the vibration of the panel 10 is reduced. Moreover, owing to the reinforcing member 80 disposed between the piezoelectric element 30 and the panel 10, a resonance frequency of the panel 10 is decreased, and sound characteristics in a low frequency range are improved. Note that instead of the reinforcing member 80 a plate-shaped weight may be attached to the piezoelectric element 30 by the joining member 70.

The panel 10 forms the touch panel of, for example, a capacitive type, and the panel 10 is supported by the housing 60a via the joining member 70. Thus, the panel 10 may be pressed with pressure ranging from 3N to 10N. The display 20 is connected to a circuit substrate 130. The piezoelectric element 30, which constitutes the vibration body together with the panel 10, is joined to the upper portion of the back surface of the panel 10 that is located on one end side in one direction of the panel 10 via the joining member 70. The piezoelectric element 30 has a rectangular shape and is joined to the panel 10 such that the major axis of the rectangular shape extends along a short side of the panel 10. The joining member 70 may be the adhesive agent, the double-sided adhesive tape, or the like having thermosetting properties, ultraviolet-curable properties, and the like. For example, the joining member 70 may be an optical elastic resin, which is a colorless and transparent ultraviolet-curable acrylic adhesive agent.

The input unit 40 is supported by the housing 60b on the other side (i.e. a lower portion) of the panel 10 in the longitudinal direction thereof. As indicated by a broken line, the input unit 40 is provided with the microphone mouthpiece 42. That is to say, the piezoelectric element 30 is disposed on the upper portion of the rectangular housing 60a, and the mouthpiece 42 is formed on the lower portion of the housing 60b. The microphone 7 is installed in the circuit substrate 130 such that the microphone 7 opposes to the mouthpiece 42. Accordingly, the microphone 7 has directivity directed toward the direction to the face of the panel 10.

Figure 4:
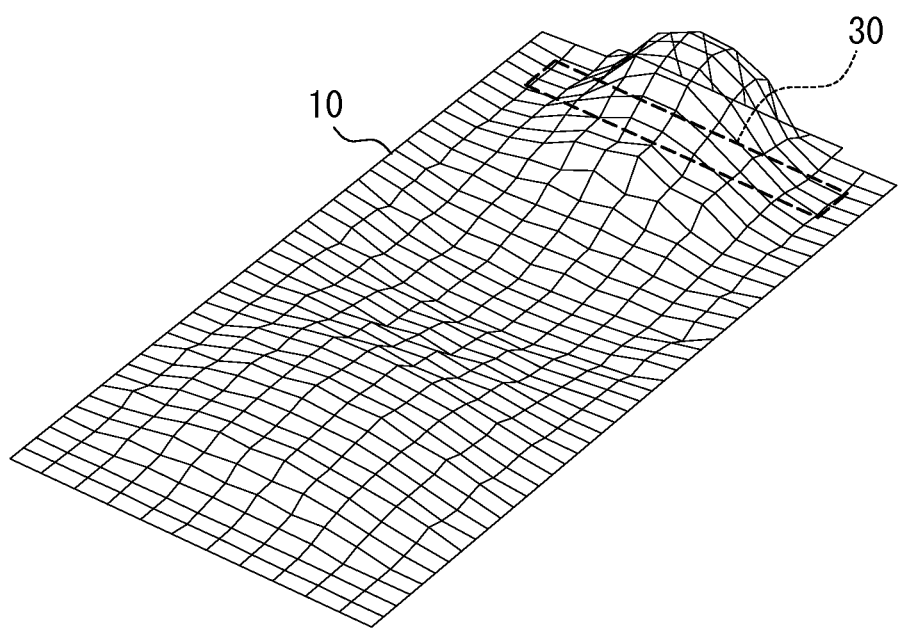
FIG. 4 illustrates one example of vibration of a panel of an electronic device according to the embodiment illustrated in FIGS. 3A to 3C.

FIG. 4 illustrates one example of the vibration of the panel 10 of the electronic device 1 according to one embodiment of the present invention. In the electronic device 1 according to the first embodiment, the panel 10 is the acryl plate with lower rigidity compared to the glass plate, and moreover, the display 20 is not adhered to the back surface of the panel 10. Accordingly, amplitude generated by the piezoelectric element 30 is larger than the case of an electronic device of a type to which the display 20 is adhered. The panel 10 in the upper portion thereof is bent directly by the piezoelectric element 30, and the vibration in the lower portion is attenuated compared to the vibration in the upper portion. The panel 10 is bent by the piezoelectric element 30 such that a portion of the panel 10 directly above the piezoelectric element 30 protrudes relative to neighboring portions of the panel 10 in a long-side direction of the piezoelectric element 30. The vibration is caused in an area of the panel 10 where the piezoelectric element 30 is disposed and in areas of the panel 10 that are away from the disposed area. Accordingly, the user is able to hear air conduction sound transmitted through air and to hear vibration sound by placing the ear in contact with any position of the panel 10.

The electronic device 1 according to the present embodiment performs one of side tone processing described with respect to the first to the third embodiment, in accordance with loudness of sound collected by the microphone 7.

Figure 5:
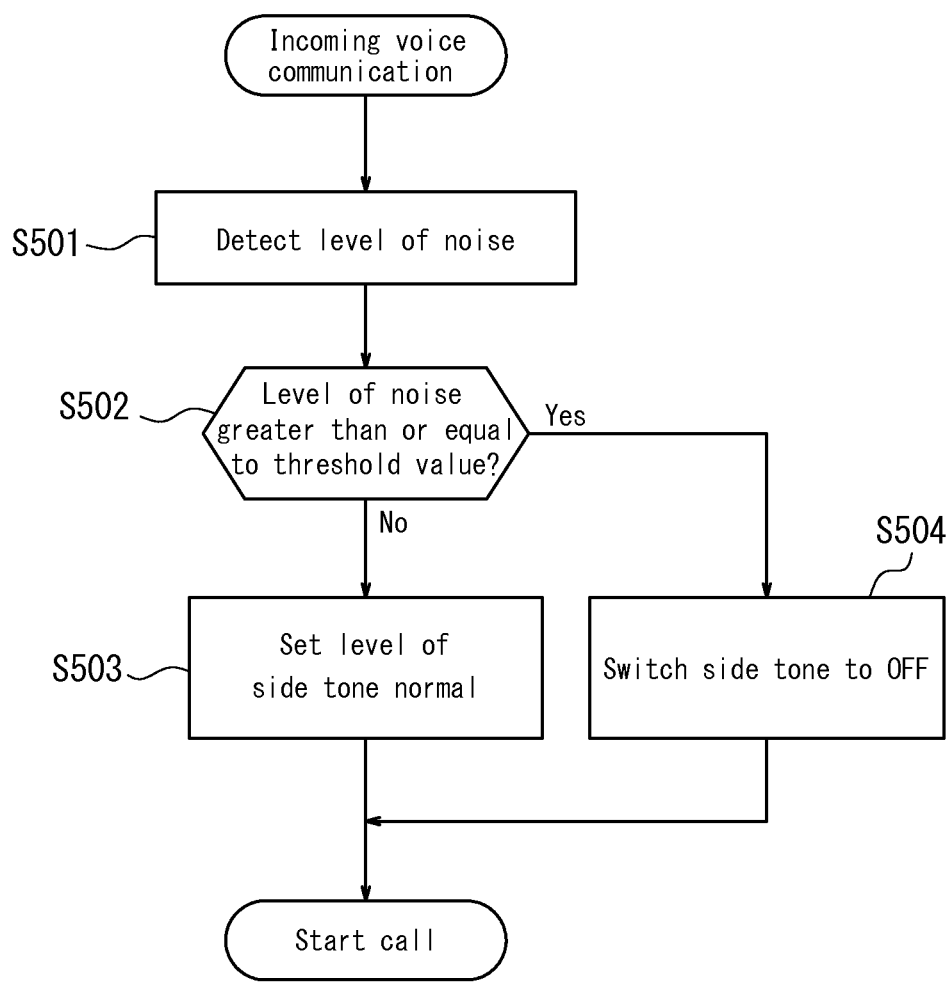
FIG. 5 is a flowchart illustrating operation of an electronic device while voice communication is in progress, according to the first embodiment of the present invention.

FIG. 5 is a flowchart illustrating operation of the electronic device 1 while voice communication is in progress, according to the first embodiment. In the present embodiment, when detecting an incoming voice call by means of the wireless communicator 5, the controller 50 executes a speaker function and detects a level of noise (sound) collected by the microphone 7 (Step S501). The level of noise may be detected, for example, by sampling signals outputted from the microphone 7 for a predetermined period of time and by subjecting the sampled output to frequency analysis performed in a sound frequency band used for transmission. Then, the controller 50 determines whether the detected level of noise is greater than or equal to a threshold value (Step S502).

Subsequently, when determining that the level of noise is less than the threshold value (NO in Step S502), the controller 50 sets a level of a side tone normal (Step S503). The side tone is generated by driving the piezoelectric element 30. That is to say, the controller 50 vibrates the piezoelectric element 30 while setting an amplification factor of a drive signal (a side-tone signal) of the piezoelectric element 30 to a normal (predetermined) amplification factor, the drive signal being produced in accordance with the signals outputted from the microphone 7.

On the other hand, when determining that the level of noise is greater than or equal to the threshold value (YES in Step S502), the controller 50 switches the side tone to OFF so as not to drive the piezoelectric element 30 based on the signals outputted from the microphone 7 (Step S504). Subsequently, the controller 50 starts voice communication via the wireless communicator 5.

Thus, according to the electronic device 1 of the present embodiment, the level of noise collected by the microphone 7 is detected before the start of voice communication, and when it is determined that the level of noise is less than the threshold value, the level of the side tone is set normal, and when it is determined that the level of noise is greater than or equal to the threshold value, the side tone is switched to OFF. Accordingly, when the level of noise is less than the threshold value, the user is able to listen to sound including transmission sound from the user as the side tone, even if the user performs voice communication with his/her ear covered by the panel 10. As a result, the user feels a reduced sense of deafness, and voice transmission quality is improved. Furthermore, when it is determined that the level of noise is greater than or equal to the threshold value, the side tone is switched to OFF. As a result, intelligibility of reception sound is improved in the presence of noise. Of course, the presence of the side tone may also be switched by an operation of the user.

The panel 10 is deformed due to deformation of the piezoelectric element 30 attached to the back surface of the panel 10. The vibration is achieved sufficiently in areas from the one end side of the panel 10 in the longitudinal direction thereof, where the piezoelectric element 30 is adhered, to around the middle portion of the panel 10. Accordingly, the user is able to hear air conduction sound and vibration sound generated by the vibration of the panel 10 by placing a part of the user's body (e.g. the cartilaginous portion of the external ear, such as a tragus) in contact with at least a portion of the areas from the middle portion to the upper portion of the panel 10. As a result, air conduction sound and vibration sound are transmitted to the user without having to protrude the vibration body from the outer surface of the housing 60. Accordingly, usability of the electronic device is improved compared to such an electronic device as described in Patent Literature 1 (Japanese Patent Application Publication No. 2005-348193), by which the user places the vibration body, which is significantly small compared to the housing, in contact with the body. Furthermore, since there is no need for pressing the user's ear to the piezoelectric element itself, the piezoelectric element 30 itself is less likely to be damaged. Moreover, although in a case where not the panel 10 but the housing 60 is deformed the user tends to drop a terminal device while the vibration is generated, such dropping is less likely to occur in the case where the panel 10 is vibrated.

Meanwhile, in the present embodiment, the display 20 and the piezoelectric element 30 are joined to the panel 10 by the joining member 70. The above structure allows attachment of the piezoelectric element 30 to the panel 10 while flexibility of deformation of the piezoelectric element 30 is not significantly limited. The joining member 70 may be the adhesive agent that is not thermosetting. The above structure provides an advantage that contraction due to a thermal stress is less likely to occur during curing between the piezoelectric element 30 and the panel 10. The joining member 70 may be the double-sided adhesive tape. The above structure provides an advantage that a contraction stress, which often occurs when the adhesive agent is used, is less likely to be applied between the piezoelectric element 30 and the panel 10. Furthermore, the panel 10 is joined to the housing 60 by the joining member 70, and therefore, the similar advantage is achieved. Besides, the vibration of the panel 10 is prevented from being transmitted directly to a cover member 62 of the housing 60, and the risk that the user drops the electronic device 1 is reduced compared to the case where the housing itself undergoes a large vibration.

Second Embodiment

An electronic device according to the second embodiment of the present invention turns, in the configuration of the electronic device 1 according to the first embodiment, a phase of the side tone into an opposite phase that weakens ambient noise. For the above purpose, the controller 50 performs side tone processing while voice communication is in progress via the wireless communicator 5.

Figure 6:
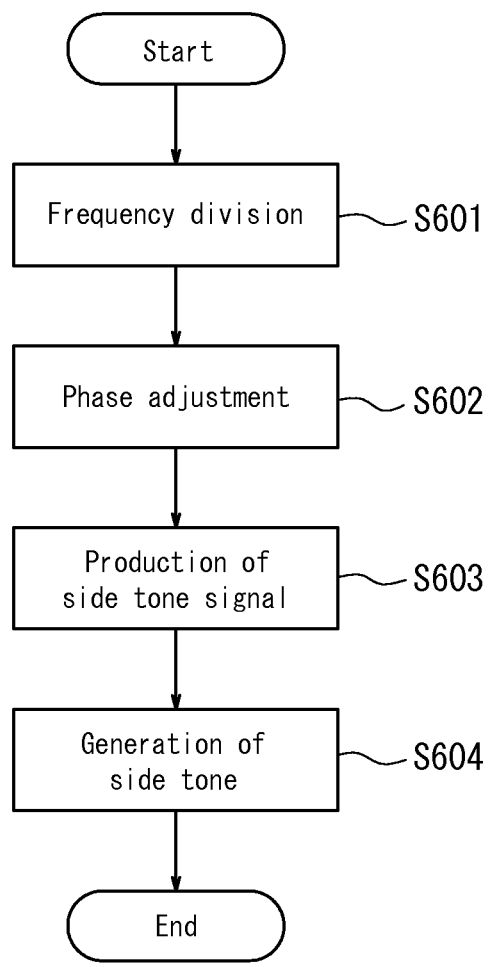
FIG. 6 is a flowchart illustrating side tone processing of an electronic device while voice communication is in progress, according to the second embodiment of the present invention.

FIG. 6 is a flowchart illustrating the side tone processing of an electronic device while voice communication is in progress, according to the second embodiment of the present invention. In the side tone processing, firstly, the signals outputted from the microphone 7 are divided into frequency bands (Step S601). The frequency bands used for the divi-sion may be set as appropriate. For example, sound to be transmitted may be divided into the frequency bands of 0 Hz to 500 Hz, 500 Hz to 1000 Hz, 1000 Hz to 1500 Hz, . . . . Subsequently, the controller 50 performs, for each of the frequency bands into which the outputted signals have been divided, phase adjustment so as to turn a phase of the corresponding outputted signal into an opposite phase that weakens noise (Step S602). The phase adjustment may be performed so as to turn a phase of an outputted signal in each of the frequency bands into a completely opposite phase or into a partially opposite phase that weakens average noise.

Subsequently, the controller 50 synthesizes the respective outputted signals in the frequency bands after the phase adjustment for producing a side tone signal (Step S603). Then, in accordance with the produced side tone signal, the controller 50 drives the piezoelectric element 30, thereby generating a side tone having an opposite phase that weakens ambient noise (Step S604).

Thus, the electronic device 1 according to the present embodiment divides the ambient noise collected by the microphone 7 into frequency bands and adjusts the phase of the side tone into an opposite phase that weakens the noise in each of the frequency bands used for the division. Accordingly, the ambient noise is reduced in real time. As a result, the sense of deafness felt by the user covering an ear with a panel during voice communication is effectively reduced, and the user is able to listen to the transmission sound from the user as the side tone. Consequently, the voice transmission quality is improved. Additionally, although in case of the present embodiment the transmission sound from the user is outputted as the side tone having an opposite phase, since the transmission sound has nothing to do with the ambient noise, the phase change has no impact. Other configurations and advantageous effects are substantially the same as those in the first embodiment.

Third Embodiment

An electronic device according to the third embodiment of the present invention adjusts, in the configuration of the electronic device 1 according to the first embodiment, the level of the side tone in accordance with a contact area of the user's ear (a contacting object) with respect to the panel 10. For the above purpose, the controller 50 has a function of detecting the contact area of the contacting object with respect to the panel 10 and executes side-tone interrupt processing in accordance with the contact area of the contacting object with respect to the panel 10 that is detected by the contact area detection function while voice communication is in progress via the wireless communicator 5.

Figure 7:
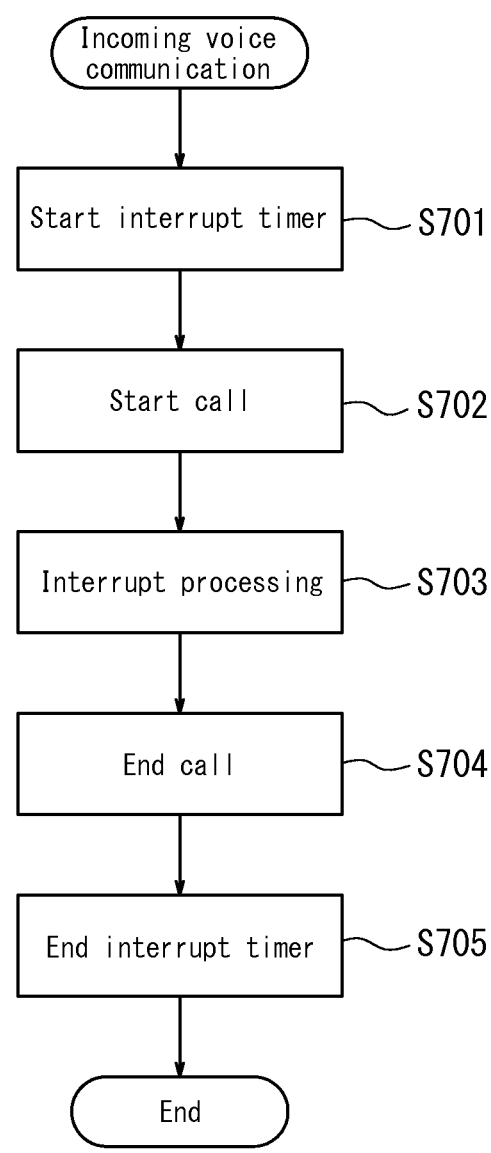
FIG. 7 is a flowchart illustrating operation of an electronic device while voice communication is in progress, according to the third embodiment of the present invention.

FIG. 7 is a flowchart illustrating operation of an electronic device while voice communication is in progress, according to the first embodiment. In the present embodiment, when detecting an incoming voice call by means of the wireless communicator 5, the controller 50 activates (starts) an interrupt timer (Step S701) and starts voice communication via the wireless communicator 5 (Step S702).

Subsequently, the controller 50 executes interrupt processing every time a set-up time elapses (Step S703). The set-up time is set by the interrupt timer started in Step S701. After that, the controller 50 ends the voice communication (Step S704) and then, ends the interrupt timer (Step S705).

Figure 8:
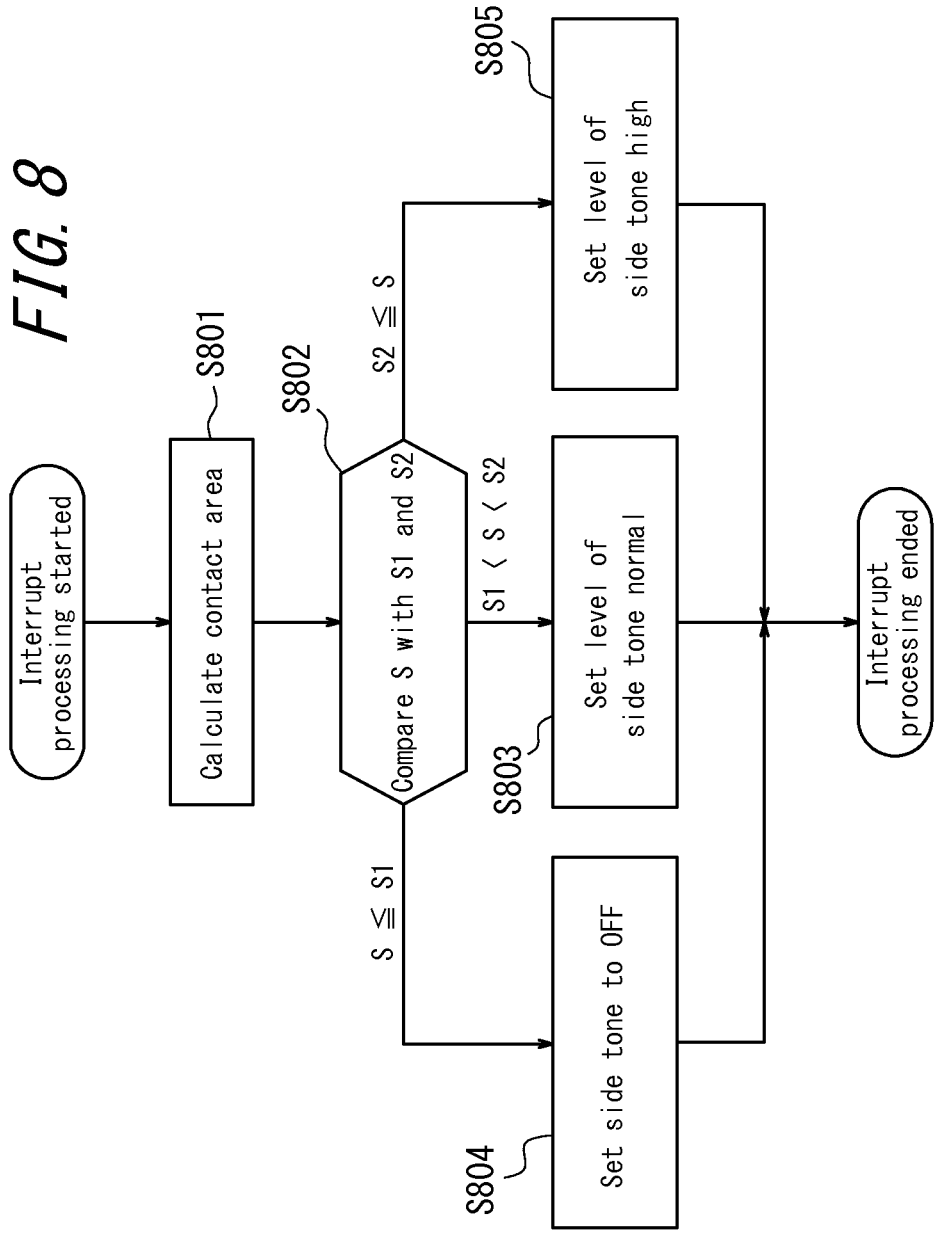
FIG. 8 is a flowchart illustrating interrupt processing of FIG. 7.

FIG. 8 is a flowchart illustrating the interrupt processing executed in Step S703 of FIG. 7. In the interrupt processing, the controller 50 firstly detects a contacting portion of the panel 10 and calculates the contact area (Step S801). Subsequently, the controller 50 compares the calculated contact area S with the first threshold value S1 and the second threshold value S2 (where S1<S2) (Step S802).

When a result of the comparison indicates S1<S<S2, the controller 50 sets the level of the side tone to be the normal (predetermined) level (Step S803). The side tone is generated by driving the piezoelectric element 30. That is to say, the controller 50 sets the amplification factor of the drive signal (the side-tone signal) of the piezoelectric element 30 to be the normal (predetermined) amplification factor, the drive signal being produced in accordance with the signals outputted from the microphone 7.

On the other hand, when the result of the comparison indicates S≤S1, the controller 50 switches the side tone to OFF (Step S804). That is to say, the controller 50 does not drive the piezoelectric element 30 based on the signals outputted from the microphone 7. In contrast, when the result of the comparison indicates S2≤S, the controller 50 sets the level of the side tone higher than the normal level (Step S805). That is to say, the controller 50 sets the amplification factor of the drive signal (the side-tone signal) of the piezoelectric element 30 to an amplification factor higher than the normal (predetermined) amplification factor, the drive signal being produced in accordance with the signals outputted from the microphone 7.

Thus, the electronic device 1 according to the present embodiment detects the contact area of the user's ear with respect to the panel 10 during voice communication and adjusts the level of the side tone in accordance with the detected contact area. That is to say, when the contact area of the panel 10 and the user's ear corresponds to a normal range, sound easily enters the user's ear as air conduction sound, and the user is less likely to feel the sense of deafness. Accordingly, the level of the side tone is set normal. Furthermore, when the contact area is below the normal range, sound easily enters the user's ear as air conduction sound, and the user is much less likely to feel the sense of deafness. Accordingly, the side tone is switched to OFF. In contrast, when the contact area is above the normal range, the ear is covered by the panel 10, and it is difficult for sound to enter the user's ear as air conduction sound, and the user is highly likely to feel the sense of deafness. Accordingly, the level of the side tone is set higher than the normal level. With the above configuration, the side tone is outputted in accordance with a contact condition of the panel 10 and the user's ear. As a result, the sense of deafness is reduced, and the voice transmission quality is improved in the presence of noise. Other configurations and advantageous effects are substantially the same as those in the first embodiment.

Fourth Embodiment

An electronic device according to the fourth embodiment prevents occurrence of howling at the end of voice communication, providing that the side tone function is executed while the voice communication is in progress with the speaker function being executed. Mobile phones generally include an ending key that is pressed when it is desired to bring voice communication to an end. However, some mobile phones have a function of, for example, bringing voice communication to an end without an operation made to the ending key, by determining a transition from the opened state to the closed state (or a detection of the closed state) as an operation made to the ending key. When such a function is set, upon reception of a signal indicating that such a mobile phone is closed, i.e., a FOLDER DET signal (FOLDER DET=0), the mobile phone does not bring voice communication to an end until the mobile phone receives the signal two or more consecutive times. The reason is to prevent an erroneous detection caused by a one-time detection.

Unless the FOLDER DET signal (FOLDER DET=0) is detected two times, there is a concern that howling might occur due to the vibration of the panel of the upper-side housing 60a as long as a sound path for the microphone is open. A description is given below of how to prevent howling in the above circumstance.

Figure 9:
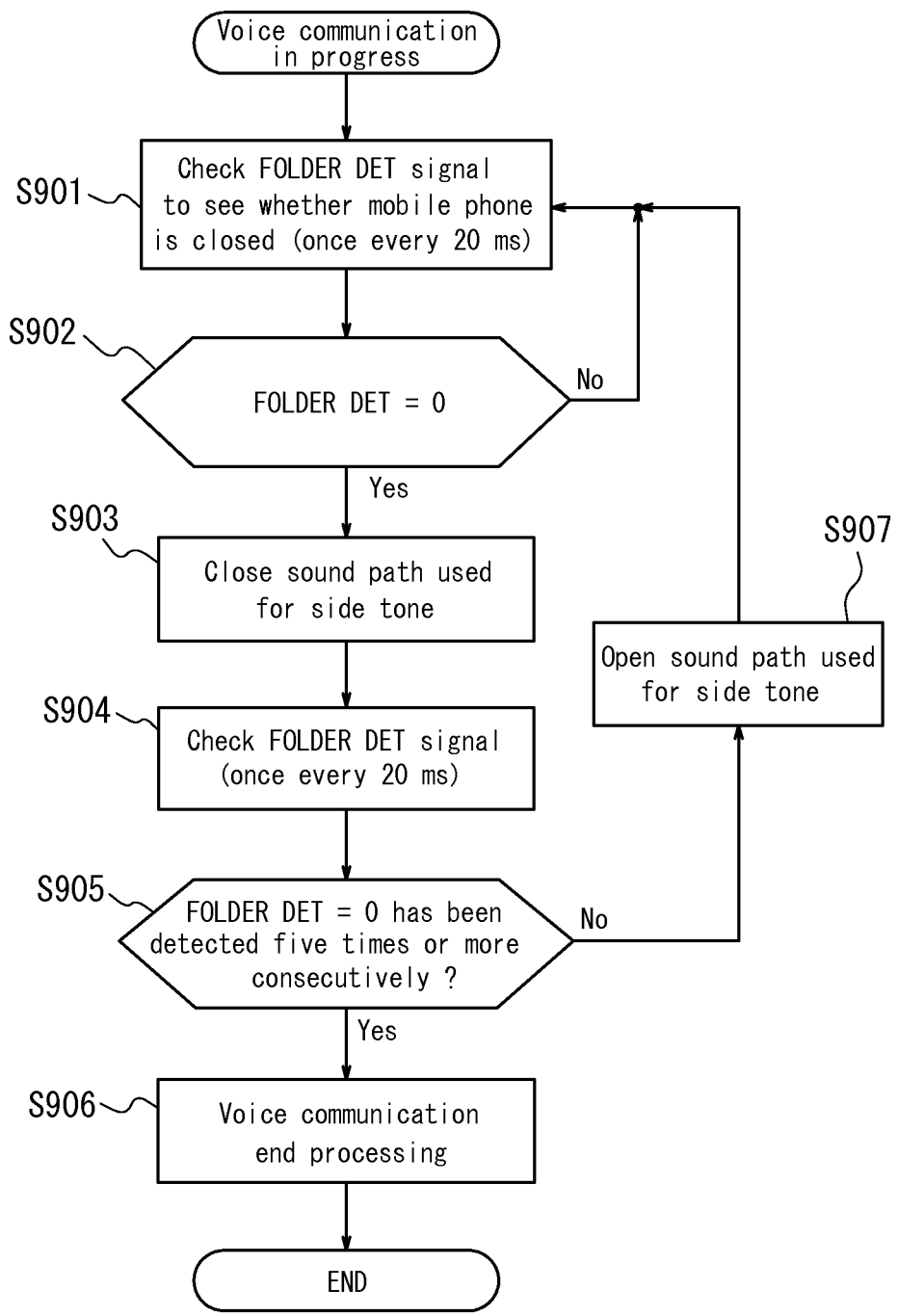
FIG. 9 is a flowchart illustrating operation of an electronic device while voice communication is in progress and when the voice communication is ended, according to the fourth embodiment of the present invention.

FIG. 9 is a flowchart illustrating operation of an electronic device while voice communication is in progress and when the voice communication is ended, according to the fourth embodiment.

In Step S901, the controller 50 constantly controls the open/close detector 100 to monitor an opened/closed state once every 20 ms. When the open/close detector detects a transition from the opened state to the closed state or detects the closed state, the FOLDER DET signal (FOLDER DET=0) is outputted.

In Step S902, the controller monitors whether FOLDER DET=0, and when FOLDER DET=0, processing moves to Step S903. When FOLDER DET=1, processing returns to Step S901.

When FOLDER DET=0, in Step S903, the controller closes the sound path used for the side tone so as to stop or interrupt the side tone function. The sound path may be closed, for example, by disconnecting a circuit for transmitting a sound signal or by turning the volume of the side tone to zero. Consequently, in the closed state, even when the side tone function is active, howling due to the vibration of the panel 10 is prevented from occurring. Subsequently, processing moves to Step S904.

In Step S904, the open/close detector 100 checks the FOLDER DET signal (FOLDER DET=0) once every 20 ms.

In Step S905, it is determined whether the FOLDER DET signal (FOLDER DET=0) has been detected predetermined times or more consecutively after the sound path used for the side tone is closed. In the figure, as one example, five times are adopted as the predetermined times. Accordingly, when the FOLDER DET signal (FOLDER DET=0) has been detected five times or more, processing moves to Step S906. When the FOLDER DET signal (FOLDER DET=0) has not been detected five times or more, processing moves to Step S907.

After the FOLDER DET signal (FOLDER DET=0) has been detected five times or more consecutively, in Step S906, it is confirmed that the user intends to end the voice communication, and call end processing is performed. Then, processing moves to Step S908.

In Step S907, since the FOLDER DET signal (FOLDER DET=0) has not been detected five times or more, the sound path used for the side tone is opened again. Then, processing moves to Step S901.

In Step S908, as the voice communication end processing is completed, the voice communication is ended. Consequently, in the closed state, howling, which is caused by the vibration body approaching to the microphone while the side tone function is executed, is prevented from occurring.

Although in the above embodiment the description is given with reference to a folding-type mobile phone, a slide-type or other types of mobile phones may also be adopted. In any case, the invention according to the present embodiment is effective in an electronic device that includes: one housing in which a piezoelectric element and a panel are provided; and another housing in which a microphone is disposed, and that is faced with the occurrence of howling due to air conduction sound or vibration sound being transmitted from the panel to the microphone in the closed state.

Although the present invention has been described based on the drawings and the embodiments thereof, it should be noted that a person skilled in the art may easily make various changes and modifications according to the present disclosure. Therefore, such changes and modifications are to be understood as included within the scope of the present invention. For example, functions and the like included in the components and steps may be rearranged as long as the functions and the like are logically consistent. A plurality of component parts, the steps, and the like may also be integrated or separated.

Furthermore, in the first embodiment, when it is determined that the level of noise is greater than or equal to the threshold value (YES) in Step S502 of FIG. 5, the side tone is switched to OFF in Step S504. However, the side tone does not need to be switched to OFF, and it is also possible to set the level of the side tone to a level lower than the normal level. That is to say, the amplification factor of the drive signal of the piezoelectric element 30 may be set to a predetermined amplification factor that is lower than the normal amplification factor, the drive signal being produced in accordance with the signals outputted from the microphone 7. Moreover, such processing of setting the level of the side tone, including switching of the side tone to ON/OFF, may be performed by the interrupt processing while voice communication is in progress as in the third embodiment.

Moreover, in the electronic device 1 according to the present embodiments, since one of the side tone processing described with respect to the first to the third embodiment is performed in accordance with the loudness of the sound collected by the microphone 7, similarly to the case of the first to the third embodiment, the sense of deafness felt by the user covering the ear with the panel 10 is reduced.

Similarly, in the third embodiment, when the result of the comparison of the contact area S in Step S802 of FIG. 8 indicates S≤S1, the side tone is switched to OFF in Step S804. However, the side tone does not need to be switched to OFF, and it is also possible to set the level of the side tone to a level lower than the normal level.

Figure 10:
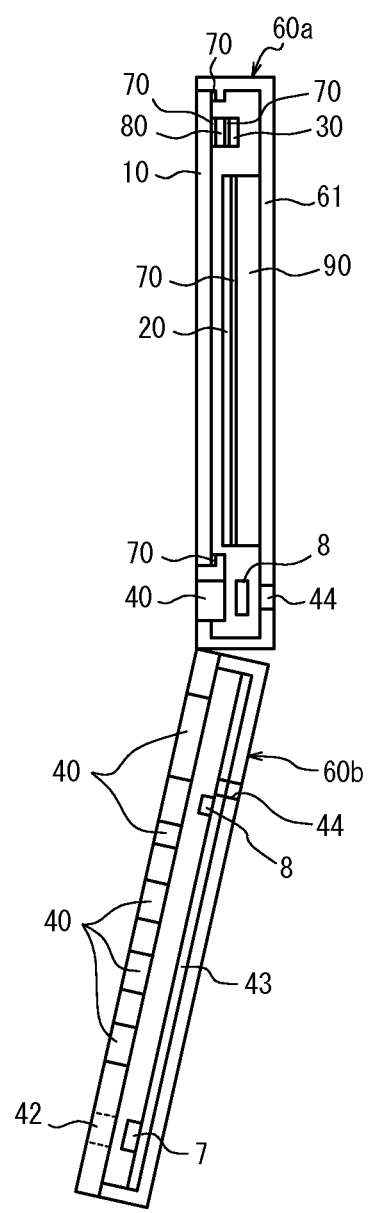
FIG. 10 is a schematic sectional view illustrating a modified example of a folding electronic device that includes a sub-microphone.

Furthermore, in the above embodiments, the single microphone 7 is used both for the transmission sound and for the collection of sound. However, the microphone 7 may function as a main microphone used for the transmission sound, and a sub-microphone used for the collection of sound may be disposed in a position different from a position of the microphone 7. In the above case, the sub-microphone is preferably disposed such that the sub-microphone has directivity directed opposite to that of the microphone 7. For example, in the folding electronic device 1 illustrated in FIGS. 3A to 3C, as illustrated in a schematic sectional view of FIG. 10, a sound collection opening 44 may be formed on a side of the housing 60a opposing to the panel 10 near a coupling portion of the upper-side housing 60a and the lower-side housing 60b. A built-in sub-microphone 8 may be mounted in a circuit substrate (which is not illustrated) such that the sub-microphone 8 opposes to the sound collection opening 44. Additionally, the position of the sub-microphone 8 is not limited to the example of FIG. 10 and may be any position different from the position of the main microphone 7.

Moreover, although in the above embodiments the side tone is outputted while voice communication is in progress, the side tone may also be outputted whenever voice communication is not in progress based on a selection of the user or the like. For example, the side tone may also be activated when a simple hearing aid function is used in the opened state. When the side tone is activated, the control described with respect to the first to the fourth embodiment may also be performed.

When the panel 10 and the display 20 are not superposed, for example, the piezoelectric element 30 may be disposed in the middle of the panel 10. When the piezoelectric element 30 is disposed in the middle of the panel 10, the vibration of the piezoelectric element 30 is evenly transmitted to the whole panel 10, thereby improving a quality of air conduction sound and allowing the user to perceive vibration sound even when the user places the ear in contact with the panel 10 at different positions of the panel 10. Note that the piezoelectric element 30 may be provided in plurality.

Although in the above electronic device 1 the piezoelectric element 30 is adhered to the panel 10, the piezoelectric element 30 may be attached to another place than the panel 10.

The panel 10 may form a part or an entirety of any one of a display panel, an operation panel, the cover panel, and a lid panel that allows a rechargeable battery to be detachable. Preferably, when the panel 10 is the display panel, the piezoelectric element 30 is disposed outside of a display area provided for a display function. The above structure provides an advantage that display is less likely to be disturbed. The operation panel may also include a sheet key, namely, a component of the folding mobile phone illustrated in FIGS. 3A to 3C or the like that is integrally provided with a key top as the operation key and that forms one surface of the housing on an operational side (the lower side).

In the above embodiments, the joining member used for adhering the panel 10 and the piezoelectric element 30, the joining member used for adhering the panel 10 and the housing 60 (60a), and the like are denoted by the same reference numeral as the joining member 70. However, the joining members may be different depending on the components to be joined, as appropriate.

Moreover, in the above embodiment, a description is given of the function of detecting the contact area of the contacting object with respect to the vibration body, by which, when the contact area detected by the contact area detection function is greater than a predetermined value, the vibration body is vibrated based on the sound collected by the microphone, and when the contact area detected by the contact area detection function is less than or equal to a predetermined value, the vibration of the vibration body based on the sound collected by the microphone is stopped. However, the present invention is not limited to the above embodiment.

For example, instead of the contact area detected by the contact area detection function, a pressure detection mechanism may be provided. In this case, when a value of pressure detected is greater than a predetermined value, the vibration body may be vibrated based on the sound collected by the microphone, and when the value of pressure detected is less than or equal to the predetermined value, the vibration of the vibration body based on the sound collected by the microphone may be stopped. A large contact area with respect to the vibration body often means that the vibration body is contacted with strong pressure. Furthermore, the sense of deafness due to a break of sound tends to occur when the vibration body is pressed against the ear with strong pressure.

The pressure applied to the panel may be easily detected. For example, in a touch panel of a resistive film type, the pressure may be easily detected by detecting a value of current or resistance thereof, and in a touch panel of a capacitive type, the pressure may be easily detected by detecting change values of capacitance thereof.

REFERENCE SIGNS 1 electronic device
5 wireless communicator
7 microphone
8 sub-microphone
10 panel
20 display
30 piezoelectric element
40 input unit
41 mouthpiece
43 circuit substrate
44 sound collection opening
50 controller
60, 60a, 60b housing
70 joining member
80 reinforcing member
90 support portion
100 open/close detector
130 circuit substrate

The invention claimed is:

1. An electronic device comprising:
a pair of housings configured to be in an opened state and a closed state;
an open/close detector configured to detect the opened/closed state of the pair of housings;
a vibration body disposed in one of the pair of housings and having a piezoelectric element and a panel; and
a microphone disposed on another one of the pair of housings, wherein
the vibration body is vibrated in the opened state, generating vibration sound that conducts through a portion of a user's body by the vibration,
wherein a side tone is executed during the vibration body being vibrated by using sound collected by the microphone,
wherein when the open/close detector detects the closed state, the side tone is stopped or interrupted,
wherein the piezoelectric element is attached to the panel, and the panel is joined via a first joining member to one of the pair of housings,
wherein one side of the first joining member is in contact with the one of the pair of housings and another side of the first joining member is in contact with the panel,
wherein the first joining member is disposed on a periphery of the panel, and
wherein the piezoelectric element is disposed inwardly from the first joining member in a planar view of the panel.

2. The electronic device of claim 1, wherein
the side tone is stopped or interrupted when the open/close detector detects the closed state for a first time during the vibration body being vibrated.

3. The electronic device of claim 1, further executes a voice communication, wherein
the side tone is executed while voice communication is in progress.

4. The electronic device of claim 1, wherein
voice communication is ended when the open/close detector has detected the closed state.

5. The electronic device of claim 4, wherein
the voice communication is ended when the open/close detector detects the closed state predetermined times or more.

6. The electronic device of claim 1, wherein
the side tone is stopped by closing a sound path used for the side tone.

7. The electronic device of claim 1, wherein
the vibration body may be pressed with pressure ranging from 3N to 10N.

8. The electronic device of claim 1, wherein,
when the sound collected by the microphone has loudness that is less than or equal to a predetermined value, the side tone is executed based on the sound collected by the microphone.

9. The electronic device of claim 1, wherein
the microphone is arranged such that the microphone has directivity directed toward a direction of a face of the vibration body.

10. The electronic device of claim 1, wherein
the piezoelectric element is disposed on one end side of the one of the pair of housings in one direction thereof.

11. The electronic device of claim 1, wherein
the panel has a rectangular shape in a planar view, a length of each of the two opposing sides of the rectangular shape being greater than or equal to a length from an antitragus to an inferior crus of antihelix.

12. The electronic device of claim 11, wherein
the panel has other two opposing sides, a length of each of the other two opposing sides being greater than or equal to a length from a tragus to an antihelix.

13. The electronic device of claim 1, wherein
the piezoelectric element is fixed such that the piezoelectric element is joined to the one of the pair of housings by a second joining member.

14. The electronic device of claim 13, wherein
the second joining member comprises an adhesive agent that is not thermosetting.

15. The electronic device of claim 13, wherein
the second joining member comprises a double-sided adhesive tape.

16. The electronic device of claim 1, wherein
the panel is fixed to the one of the pair of housings by a joining member.

17. The electronic device of claim 16, wherein
the joining member comprises an adhesive agent that is not thermosetting.

18. The electronic device of claim 16, wherein
the joining member comprises a double-sided adhesive tape.

19. The electronic device of claim 1, wherein
the panel forms a part or an entirety of any of a display, an input unit, and a cover of the display.

20. The electronic device of claim 19, wherein
a portion of the panel where the piezoelectric element is fixed is located outside of a portion of the panel that overlaps with the display in a planar view.

21. The electronic device of claim 20, wherein
the display is fixed to the panel from an inside of the one of the pair of housings.

22. The electronic device of claim 1, wherein
the vibration body is configured to generate air conduction sound.

23. An electronic device comprising:
a pair of housings configured to be in an opened state and a closed state;

an open/close detector configured to detect the opened/closed state of the pair of housings;

a vibration body disposed in one of the pair of housings; and a microphone disposed on another one of the pair of housings, wherein the vibration body is vibrated in the opened state, executing a speaker function of generating vibration sound that conducts through a portion of a user's body by the vibration, wherein a side tone function is executed during the execution of the speaker function by using sound collected by the microphone, wherein when the open/close detector detects the closed state, the side tone function is stopped or interrupted, wherein the vibration body includes: a piezoelectric element; and a panel configured to support the piezoelectric element, wherein the panel is held by the one of the pair of housings, and wherein the panel is bent by the piezoelectric element such that an area of the panel above the piezoelectric element protrudes higher than other areas of the panel.

* * * * *